United States Patent
Al-Haj et al.

(10) Patent No.: US 11,471,847 B2
(45) Date of Patent: Oct. 18, 2022

(54) PROCESS FOR PROVIDING A HOMOGENOUS SLURRY CONTAINING PARTICLES

(71) Applicant: BOREALIS AG, Vienna (AT)

(72) Inventors: Mohammad Ali Al-Haj, Porvoo (FI); Kauno Alastalo, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/297,438

(22) PCT Filed: Nov. 28, 2019

(86) PCT No.: PCT/EP2019/082883
§ 371 (c)(1),
(2) Date: May 26, 2021

(87) PCT Pub. No.: WO2020/109454
PCT Pub. Date: Jun. 4, 2020

(65) Prior Publication Data
US 2022/0023815 A1 Jan. 27, 2022

(30) Foreign Application Priority Data
Nov. 29, 2018 (EP) .................................... 18209100

(51) Int. Cl.
*B01J 8/10* (2006.01)
(52) U.S. Cl.
CPC ............ *B01J 8/10* (2013.01); *B01J 2208/003* (2013.01); *B01J 2208/00867* (2013.01); *B01J 2219/00189* (2013.01)
(58) Field of Classification Search
CPC ..... B01J 8/10; B01J 8/085; B01J 8/001; B01J 2208/0061; B01J 2208/00769;
(Continued)

(56) References Cited

U.S. PATENT DOCUMENTS

2019/0225715 A1* 7/2019 Moman .................... B01J 37/04

FOREIGN PATENT DOCUMENTS

WO 2015/177014 A1 11/2015
WO 2016/036722 A1 3/2016

OTHER PUBLICATIONS

International Preliminary Report on Patentability and Written Opinion of the International Searching Authority for related International Application No. PCT/EP2019/082883, dated May 25, 2021, 7 pages.
(Continued)

*Primary Examiner* — Lessanework Seifu
(74) *Attorney, Agent, or Firm* — Ditthavong, Steiner & Mlotkowski

(57) ABSTRACT

The present invention is concerned with a process for providing a homogeneous particle-containing slurry comprising the steps of:

(a) providing a vessel comprising at least one impeller rotating around a vertical axis of the vessel, the vessel further comprising an inlet and an outlet;

(b) introducing the particle-containing slurry into the vessel or introducing components forming the particle-containing slurry into the vessel;

(c) rotating the at least one impeller at least around the vertical axis for homogenizing and/or maintaining a homogeneous particle distribution within the slurry;

(d) withdrawing the homogeneous particle-containing slurry via the outlet;

(e) stopping the at least one impeller for a maximum time T, whereby T is calculated according to the following relations:
(Continued)

Exemplary vessel used in present invention.

$$u_T = \sqrt{\frac{4g(\rho_p - \rho_f)D_p}{3\rho_f C_D}} \quad (1)$$

$$C_D = \frac{24}{\text{Re}}[1 + 0.173\text{Re}^{0.657}] \quad (2)$$

$$T = \frac{h}{u_T}. \quad (3)$$

5 Claims, 1 Drawing Sheet

(58) Field of Classification Search
CPC ............ B01J 2208/00867; B01J 19/004; B01J 19/0066; B01J 19/06; B01J 2219/00182; B01J 2219/00189; B01J 2219/002
See application file for complete search history.

(56) References Cited

OTHER PUBLICATIONS

Arsenijevic et al., "Determination of non-spherical particle terminal velocity using particulate expansion data", Powder Technology, vol. 103, Issue 3, Jul. 26, 1999, 12 pages.

\* cited by examiner

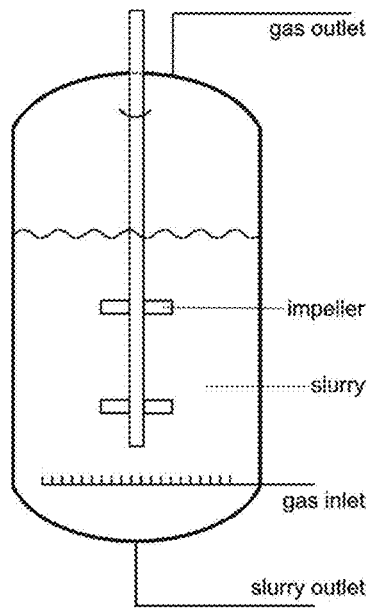
Figure 1: Exemplary vessel used in present invention.
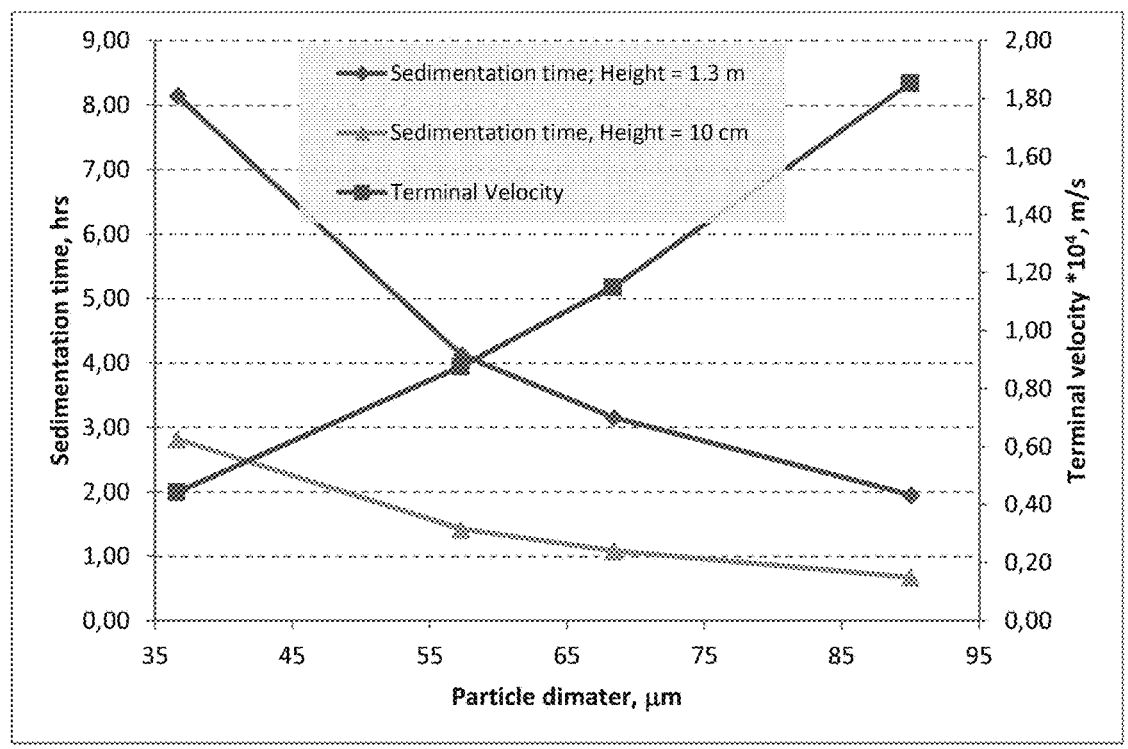
Figure 2: Sedimentation time for different particles average diameters along the whole height of the vessel (Example 1).

PROCESS FOR PROVIDING A HOMOGENOUS SLURRY CONTAINING PARTICLES

The present invention relates to a process for providing a homogenous slurry containing particles in a stirred-tank vessel.

BACKGROUND

Slurry reactors are widely implemented in the production of polymers, in particular in the production of olefin based polymers. Preferable embodiments of such reactors are continuous stirred tank reactors (CSTR). Such reactors are equipped with a mixer provided by a rotatable vertical axis, to which one or more impellers are mounted. In these reactors, the impellers are kept rotating to prevent or minimize sedimentation of the particles in the slurry.

EP 1 133 350 A1 is concerned with problems of such reactors using separator plates causing the formation of plugs or blockages. The presence of blockages may cause the subsequent formation of lumps in the slurry or the formation of hot spots within the reactor vessel. Moreover, the presence of separator plates results in a much broader residence time distribution pattern. EP 1 133 350 A1 provides as a solution a reactor formed from a single non-partitioned reaction chamber lined longitudinally with baffles to aid mixing.

EP 0 446 059 A1 uses continuously stirred tank reactors to prepare a catalyst slurry, which is introduced into the reactor in the form of a prepolymer suspension prepared in a prepolymerization zone, to prevent the catalyst introduced into the reactor and the polymer formed from containing excessively fine particles which can be entrained by the gaseous stream and clog the recycle gas pipes.

However, such reactors still have drawbacks. For example, if the level of slurry is passing an impeller e.g. during withdrawal of the slurry from the vessel, splashing of slurry onto the walls of the vessel is caused. Consequently, catalyst mud/paste is accumulated on the wall of the vessel. This accumulated lump might fall down and block the outlet, preferably located at the bottom of the vessel.

One possible solution to this problem is the usage of down- and/or up-pumping hydrofoil impellers for a down-pumping configuration such as described in the '*Handbook of Industrial Mixing: Science and Practice*', edited by: Paul, E., Atiemo-Obeng, V., Kresta, S. John Wiley and Sons, 2004. pp. 345-390 as well as in '*Unit Operations of Chemical Engineering*', McCabe, W., Smith, J., Harriott, P., and Mcgraw-Hill, 1993. Such impellers generally enhance the mixing inside the vessel and reduce the splashing of the slurry to vessel walls. Nevertheless, still splashing occurs when the slurry level is at the level of the impeller.

Object of the Present Invention

Hence, in view of the above-mentioned problem in the prior art, it is an object of the present invention to provide a process for providing a homogenous slurry containing particles having reduced splashing in a continuous stirred tank reactor in particular if the level of the slurry is close to the level of an impeller.

It now has been surprisingly discovered by the inventors that the splashing effect of slurry in continuous stirred-tank reactors can be significantly reduced in that the rotational speed of the impeller is stopped when the level of the slurry is close to the upper or lower level of the impeller.

However, stopping the rotational speed of the impeller might lead to sedimentation of the particles of the slurry in the slurry phase. Sedimentation on the other hand should be prevented as it can block the outlet of the vessel, decrease the yield of the reactor or further block the stirring of the reactor leading to total failure of the system.

SUMMARY OF THE INVENTION

It has now been surprisingly found by the inventors that the splashing effect in continuous stirred-tank reactors can be significantly reduced and sedimentation of the particles in the slurry can be prevented at the same time, if the impeller is stopped only for a certain predetermined time preventing sedimentation when the level of the slurry is close to the upper or lower level of the impeller.

Hence, the present invention provides a process for providing a homogeneous particle-containing slurry comprising the steps of:
(a) providing a vessel comprising at least one impeller rotating around a vertical axis of the vessel, the vessel further comprising an inlet and an outlet;
(b) introducing the particle-containing slurry into the vessel or introducing components forming the particle-containing slurry into the vessel;
(c) rotating the at least one impeller at least around the vertical axis for homogenizing and/or maintaining a homogeneous particle distribution within the slurry;
(d) withdrawing the homogeneous particle-containing slurry via the outlet;
(e) stopping the at least one impeller for a maximum time T, whereby T is calculated according to the following relations (1) to (3):

$$u_T = \sqrt{\frac{4g(\rho_p - \rho_f)D_p}{3\rho_f C_D}} \quad (1)$$

$$C_D = \frac{24}{\text{Re}}[1 + 0.173\text{Re}^{0.657}] \quad (2)$$

$$T = \frac{h}{u_T} \quad (3)$$

BRIEF DESCRIPTION OF THE DRAWINGS

FIG. 1 illustrates an exemplary vessel used in the present invention.

FIG. 2 is a graph showing sedimentation time for different particle average diameters along the whole height of the vessel, according to Example 1.

DEFINITIONS

The term splashing as used herein has to be understood as an uncontrolled process of distribution of parts of the slurry by the impeller, whereby the slurry is distributed onto the walls of the vessel. Splashing occurs predominantly if the impeller is close to the level of the slurry. Hence, the impeller rotates close to the phase boundary between the liquid carrier of the slurry and the gas phase, throwing parts of the slurry up in the gas phase and onto the walls of the vessel.

Sedimentation as used herein describes the tendency of particles in the slurry to settle out of the liquid and come to rest at the bottom of the vessel. The force causing this effect is the gravitational force, which drags the particles from all over the slurry to the bottom. Hence, if no other force is affected on the particles, they will settle within a certain time, called sedimentation time. Herein, the term sedimentation time is understood as the time needed to achieve sedimentation in an amount to lose the homogeneity of the slurry. The sedimentation time as used herein has to be understood as the time needed for a particle to travel a predefined distance that is determined based on the dimensions of the vessel, e.g. the height of the vessel, in vertical direction to the bottom of the vessel.

The term vessel as used herein describes a container having an inlet and an outlet, the outlet preferably being at the bottom of the vessel (in direction of the gravitational force). Furthermore, the vessel has a rotatable vertical axis, which proceeds vertically with respect of the direction of the gravitational force. At least one impeller is attached to this axis. The container can generally have any shape. A cylindrical shape with the vertical axis proceeding parallel to the cylindrical walls is preferred.

The term impeller as used herein has to be understood as a rotor, which influences the flow of the liquid in the vessel. Thereby the rotor generally can have any shape as long as at least a partial radial flow of the liquid is caused if the impeller is rotated. Impellers inducing also a partial axial flow of the liquid such as hydrofoil impellers are preferred herein.

The rotational speed of the impeller around the vertical axis of the vessel is understood as the number of turns of the impeller divided by time specified as revolutions per minute (rpm).

The term level of the slurry denotes the phase boundary between the liquid of the slurry and the gas phase layer above the slurry in the vessel.

DETAILED DESCRIPTION OF THE PRESENT INVENTION

The inventors have found a process for providing a homogeneous particle-containing slurry comprising the steps of:
(a) providing a vessel comprising at least one impeller rotating around a vertical axis of the vessel, the vessel further comprising an inlet and an outlet;
(b) introducing the particle-containing slurry into the vessel or introducing components forming the particle-containing slurry into the vessel;
(c) rotating the at least one impeller at least around the vertical axis for homogenizing and/or maintaining a homogeneous particle distribution within the slurry;
(d) withdrawing the homogeneous particle-containing slurry via the outlet;
(e) stopping the at least one impeller for a maximum time T, whereby T is calculated according to the following relations:

$$u_T = \sqrt{\frac{4g(\rho_p - \rho_f)D_p}{3\rho_f C_D}} \quad (1)$$

$$C_D = \frac{24}{Re}[1 + 0.173 Re^{0.657}] \quad (2)$$

$$T = \frac{h}{u_T} \quad (3)$$

with $u_T$=terminal velocity for particles with average diameter $D_p$,
g=gravitational constant,
$\rho_p$=particle density in the slurry,
$\rho_f$=density of the liquid phase of the slurry,
$D_p$=average diameter of the particles in the slurry
$C_D$=drag coefficient,
Re=Reynolds number,
h=pre-determined height (e.g. vessel height).

Preferably, the stopping is effected when the level of the slurry during withdrawal is close to the vertically upper end of the impeller until the lower end of the impeller with respect to the vertical axis is above the level of the slurry.

In the process of the present invention, the required time T needed for particles of pre-specified diameter is estimated using the free falling theory when the rotational speed inside vessel is set to zero (equation (3)). The termination velocity $u_T$ helps in estimating the average residence time of different particles inside the vessel (equations (1) and (2)). The average residence time on the other hand can be used to decide if the particles precipitate when the impeller is stopped or will float for the time the impeller is stopped.

This invention discloses a process for operating a continuously stirred tank reactor, e.g. feeding vessels, resulting in minimum or even elimination of splashing of slurry on the wall of the vessel. This is achieved by the process as described above, in which the rotational speed of the impeller is stopped for a pre-determined time. Such process has the advantage of ensuring minimum material accumulation on the wall and consequently avoiding blockage of the vessel outlet or failure of the process in general. Moreover, this process ensures that the quality of the slurry is not deteriorated because of particles segregation and sedimentation.

Even more preferably, in the process according to the present invention the stopping of the rotational speed of the impeller is effected when the level of the slurry during withdrawal is within a range from $0.5*D_a$ (diameter of the impeller) above the vertically upper end of the impeller with respect to the vertical axis of the impeller. Furthermore, it is preferred that the rotation of the impeller is continued when the level of the slurry is $0.05*D_a$ below the vertically lower end of the impeller with respect to the vertical axis of the impeller.

The process of the present invention generally works with vessels having any dimensions An impeller as comprised in the vessel according to the present invention preferably extends at least partially into the horizontal plane being orthogonal to said vertical axis and further extends at least partially into the direction of said vertical axis. Thereby an up- or down-pumping effect can be achieved depending on the orientation of the horizontal plane alongside the direction of the vertical axis. If the plane orientates alongside the direction of the vertical axis towards the upper part of the vessel, an up-pumping impeller is provided. On the other hand, if the plane orientates alongside the direction of the vertical axis towards the lower part of the vessel, a down-pumping impeller is provided. In the process according to the present invention, down-pumping impellers are preferred.

The vessel in the process according to the present invention can comprise only one impeller or preferably more than one impeller at different levels of height with respect to the vertical axis of the vessel.

If more than one impeller is comprised by the vessel, these impellers can be connected to the rotatable vertical axis in a way that all connected impellers have the same rotational speed. This might be achieved e.g. in that there is only one rotatable axis comprised in the vessel. In such an embodiment, all impellers will be stopped if one impeller is stopped to avoid splashing of the slurry.

In another even more preferred embodiment more than one impeller can be present in the vessel which all can be driven independently of each other by their own rotational speed. Each of their axes could be driven by separate engines allowing for individual rotational speeds of the impellers. In such an embodiment, only one impeller could be stopped to avoid splashing of the slurry, while the other impellers still maintain their original rotational speed. Preferably, in such an embodiment, the reducing of the rotational speed of only one impeller is effected when the level of the slurry during withdrawal is within a range from $0.5*D_a$ (diameter of the impeller) above the vertically upper end of said impeller to $0.05*D_a$ below the vertically lower end of said impeller with respect to the vertical axis of said impeller.

In the process according to the present invention in step (e) the impeller is stopped (n=0) for not longer than time T according to equations (1)-(3). This process is in particular advantageous if the splashing should be reduced as much as possible.

EXAMPLES

Example 1

This example illustrates stopping the rotation of the impeller for a certain time. For several average particle sizes in the slurry (36.6, 57.3, 68.4, 9.9 µm) the terminal velocities and the sedimentation times have been calculated for vessel heights of 130 and 10 cm (cf. FIG. 2). The respective data as used and calculated can be found in Table 1.

TABLE 1

Calculations according to Example 1; calculated particle travel times for a height of 130 cm ($t_{130}$) and for a height of 10 cm ($t_{10}$)

| Provided data | | | | | Calculated data | | |
|---|---|---|---|---|---|---|---|
| $D_P$ [µm] | $\rho_f$ [kg m³] | $\rho_p$ [kg m³] | Re | $C_D$ | $u_T$ [10⁴ m/s] | $T_{130}$ [h] | $T_{10}$ [h] |
| 36.6 | 907 | 1300 | 0.000228 | 105108 | 0.44 | 8.15 | 0.63 |
| 57.3 | 907 | 1300 | 0.00057 | 42196 | 0.88 | 4.13 | 0.32 |
| 68.4 | 907 | 1300 | 0.000819 | 29356 | 1.15 | 3.15 | 0.24 |
| 90.0 | 907 | 1300 | 0.001619 | 14862 | 1.85 | 1.95 | 0.15 |

Due to the relatively high viscosity of the slurry and small particles sizes, the termination velocity of the particles in the liquid is very small, whereby the values do not exceed $2.5 \times 10^{-4}$ m/s. Particles with smaller diameter have lower terminal velocities and, hence, need more time to travel along the vertical dimension of the vessel. Therefore, in case of particles with higher diameter, the sedimentation time is shorter and, hence, the time T, in which the impeller can be stopped, is smaller. Considering catalyst particles with a diameter of about 90 µm, the maximum possible time to stop the rotation of the impeller while ensuring no sedimentation is about 2 hours.

The best operational mode is achieved if the rotational speed is stopped when the level of the slurry is $0.5*D_a$ (diameter of the impeller) above the vertically upper end of the impeller and $0.05*D_a$ below above the vertically lower end of the impeller. If the rotational speed is stopped later and/or started earlier than these values, splashing is not completely avoided. On the other hand, if the rotational speed is stopped earlier and/or started later than these values, the overall operation is significantly slowed down. Furthermore, too long stopping intervals could lead to sedimentation and total failure of the process.

The invention claimed is:

1. A process for providing a homogeneous particle-containing slurry comprising the steps of:
   (a) providing a vessel comprising at least one impeller rotating around a vertical axis of the vessel, the vessel further comprising an inlet and an outlet;
   (b) introducing a particle-containing slurry into the vessel or introducing components forming the particle-containing slurry into the vessel;
   (c) rotating the at least one impeller at least around the vertical axis for homogenizing and/or maintaining a homogeneous particle distribution within the slurry;
   (d) withdrawing the homogeneous particle-containing slurry via the outlet;
   (e) stopping the at least one impeller for a maximum time T, whereby T is calculated according to the following relations:

$$u_T = \sqrt{\frac{4g(\rho_p - \rho_f)D_p}{3\rho_f C_D}} \quad (1)$$

$$C_D = \frac{24}{\text{Re}}[1 + 0.173\text{Re}^{0.657}] \quad (2)$$

$$T = \frac{h}{u_T} \quad (3)$$

with
$u_T$=terminal velocity in the vessel for particles with average diameter $D_p$,
g=gravitational constant,
$\rho_p$=particle density in the slurry,
$\rho_f$=density of the liquid phase of the slurry,
$D_p$=average diameter of the particles in the slurry
$C_D$=drag coefficient,
Re=Reynolds number,
h=pre-determined height (of the vessel height);
wherein the stopping of the at least one impeller is effected when the level of the slurry during withdrawal is within a range from $0.5*D_a$ to $0.1*D_a$ above the vertically upper end of the at least one impeller, with $D_a$ being the diameter of the impeller.

2. The process according to claim 1, wherein the at least one impeller has a vertically upper end with respect to the vertical axis of the at least one impeller and a vertically lower end with respect to the vertical axis of the vessel and wherein the stopping of the at least one impeller is continued until the level of the slurry is within a range from $0.1*D_a$ to $0.05*D_a$ below the vertically lower end of the impeller.

3. The process according to claim 1, wherein the vessel comprises more than one impeller at different height levels with respect to the vertical axis of the vessel and wherein one or more of said impellers is stopped according to step (e).

4. The process according to claim 3, wherein each impeller can be stopped independently from the remaining impellers.

5. The process according to claim 1, wherein the at least one impeller extends at least partially into the horizontal plane being orthogonal to said vertical axis and further extends at least partially into the direction of said vertical axis.

* * * * *